US009083466B2

(12) United States Patent
Yoshima

(10) Patent No.: US 9,083,466 B2
(45) Date of Patent: Jul. 14, 2015

(54) OPTICAL LINE TERMINAL

(75) Inventor: Satoshi Yoshima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 10 days.

(21) Appl. No.: 14/005,996

(22) PCT Filed: Sep. 9, 2011

(86) PCT No.: PCT/JP2011/005098

§ 371 (c)(1), (2), (4) Date: Sep. 18, 2013

(87) PCT Pub. No.: WO2013/035139

PCT Pub. Date: Mar. 14, 2013

(65) Prior Publication Data

US 2014/0010556 A1 Jan. 9, 2014

(51) Int. Cl.
*H04B 10/69* (2013.01)
*H04B 10/272* (2013.01)

(52) U.S. Cl.
CPC .......... *H04B 10/272* (2013.01); *H04B 10/6931* (2013.01); *H04B 10/6932* (2013.01)

(58) Field of Classification Search
USPC ............................................ 398/43, 202–214
See application file for complete search history.

(56) References Cited

U.S. PATENT DOCUMENTS

2008/0152358 A1 * 6/2008 Uto ............................... 398/202
2008/0253763 A1 10/2008 Uda et al.
2010/0067913 A1 * 3/2010 Niibe et al. ..................... 398/98

FOREIGN PATENT DOCUMENTS

JP 2007243285 A * 9/2007
JP 2008-160734 7/2008
JP 2008-227992 9/2008
JP 2010-157911 7/2010
JP 2011-91585 5/2011

OTHER PUBLICATIONS

International Search Report Issued Nov. 1, 2011 in PCT/JP2011/005098 Filed Sep. 9, 2011.

IEEE, "Part 3: Carrier Sense Multiple Access with Collision Detection (CSMA/CD) Access Method and Physical Layer Specifications", IEEE Computer Society, IEEE Standard 802.3av, 2009, 234 Pages.

* cited by examiner

*Primary Examiner* — David Payne
*Assistant Examiner* — Casey Kretzer
(74) *Attorney, Agent, or Firm* — Oblon, McClelland, Maier & Neustadt, L.L.P.

(57) ABSTRACT

To enable optical line terminal to detect input disconnection of optical burst signal accurately in spite of changes of transmission rate of optical-burst signal received from optical network unit, OLT (optical line terminal) includes photodetector for converting the optical-burst signal received to current signal; preamplifier for converting the current signal to voltage signal; input disconnection detecting circuit for comparing output amplitude of preamplifier with threshold, and for outputting input disconnection signal indicating disconnection of input of the optical-burst signal; and control circuit for controlling conversion gain of preamplifier in a manner that the conversion gain becomes conversion gain corresponding to the transmission rate of the optical-burst signal received, and for controlling input disconnection detecting circuit in a manner that it outputs the input disconnection signal in response to the threshold corresponding to the transmission rate of the optical-burst signal received.

8 Claims, 9 Drawing Sheets

100
Main Signal Output
Input Disconnection Signal
7
Control Signal
5
6
8
1G Comparator Circuit
10G Comparator Circuit
Threshold Circuit
3
LIA Circuit
Amplitude Detecting Circuit
4
50
2
21
22
23
R1
R2
1
Optical Burst Signal 100
Main Signal Output
Input Disconnection Signal
7
3
31
Amplitude Defecting Circuit
4
Addition Circuit
9
5
6
1G Comparator Circuit
10G Comparator Circuit
8
Threshold Circuit
50
Control Signal
2
21
22
23
R1
R2
1
Optical Burst Signal

OPTICAL LINE TERMINAL

TECHNICAL FIELD

The present invention relates to an optical line terminal (OLT) constituting a PON (Passive Optical Network) system.

BACKGROUND ART

A 10G-EPON (Gigabit Ethernet (registered trademark) Passive Optical Network) system has been known which connects a plurality of optical network units (ONU) installed in subscriber's homes to an OLT installed in a station through optical fibers (see Non-Patent Document 1, for example). In such a 10G-EPON system, a first ONU transmits an optical burst signal to the OLT at the transmission rate of 1.25 Gbps (Gigabit per sec), and a second ONU transmits an optical burst signal to the OLT at the transmission rate of 10.3125 Gbps. Since the optical burst signals with the different transmission rates have wavelength ranges overlapping with each other, the optical burst signals from a plurality of ONUs are time division multiplexed before transmission to the OLT.

As for optical receivers in the OLT to which the optical burst signals are input, they are required to have appropriate reception sensitivity for a plurality of optical burst signals with different transmission rates. Therefore conventionally, the conversion gain of a preamplifier circuit constituting each optical receiver is controlled in accordance with the transmission rate of the optical burst signal to achieve the appropriate reception sensitivity corresponding to each transmission rate (see Patent Document 1, for example).

On the other hand, it is necessary for the OLT to positively detect the disconnection when the input of the optical burst signal is disconnected. To achieve this, if the input disconnection is detected, the optical receiver must accurately output the input disconnection signal indicating that the input is disconnected. The input disconnection signal is output when the amplitude of the output signal of the preamplifier circuit is smaller than a preset threshold, and the OLT detects erroneous light emission of the ONU according to the presence or absence of the input disconnection signal.

PRIOR ART DOCUMENT

Patent Document

Non-Patent Document 1: IEEE Standard 802.3av (2009).

Patent Document 1: Japanese Patent Laid-Open No. 2010-157911.

DISCLOSURE OF THE INVENTION

Problems to be Solved by the Invention

However, each preamplifier circuit of the foregoing OLT controls the conversion gain of the optical burst signal in accordance with the transmission rate, and hence if the transmission rate of the input optical burst signal differs, the amplitude of the output signal varies greatly even if the optical input power is the same. Accordingly, depending on the transmission rate of the optical burst signal, the preset threshold is inappropriate and the input disconnection signal is output erroneously, which presents a problem in that the OLT detects the input disconnection erroneously.

The present invention is implemented to solve the foregoing problem. Therefore it is an object of the present invention to provide an OLT capable of detecting the input disconnection accurately.

Means for Solving the Problem

An optical receiver in accordance with the present invention, which is an optical receiver that receives optical burst signals with different transmission rates from transmission sources via an optical transmission line, the optical receiver comprising: a photo-detector for converting the optical burst signal received to a current signal; a preamplifier circuit for converting the current signal to a voltage signal; an amplitude detecting circuit for detecting the amplitude of the voltage signal undergoing the conversion of the preamplifier circuit; a threshold circuit having a plurality of thresholds which correspond to transmission rates of the optical burst signals and are set in advance; and an input disconnection detecting circuit including a plurality of comparator circuits for comparing the amplitude detected by the amplitude detecting circuit with each of the plurality of thresholds output from the threshold circuit, and for individually outputting an input disconnection signal indicating disconnection of input of the optical burst signal if the amplitude is lower than the threshold, and a selector for selecting one of the plurality of input disconnection signals output from the plurality of comparator circuits, wherein the selector selects the input disconnection signal in accordance with the threshold corresponding to the transmission rate of the optical burst signal received.

In addition, an optical receiver that receives optical burst signals with different transmission rates from transmission sources via an optical transmission line, the optical line terminal comprising: a photo-detector for converting the optical burst signal received to a current signal; a preamplifier circuit for converting the current signal to a voltage signal; an amplitude detecting circuit for detecting the amplitude of the voltage signal undergoing the conversion of the preamplifier circuit; a threshold circuit having a plurality of thresholds which correspond to transmission rates of the optical burst signals and are set in advance, and an input disconnection detecting circuit for comparing the amplitude detected by the amplitude detecting circuit with the threshold which is output from the threshold circuit and corresponds to the transmission rate of the optical burse signal decided from information about a schedule of transmitting the optical burst signals from the transmission sources, and for outputting an input disconnection signal of the optical burst signal if the amplitude is lower than the threshold.

Advantages of the Invention

According to the OLT in accordance with the present invention, since it outputs the input disconnection signal in conformity with the threshold corresponding to the transmission rate of the input optical burst signal, it can detect the input disconnection accurately.

BEST MODE FOR CARRYING OUT THE INVENTION

Embodiment 1

Figure 1:
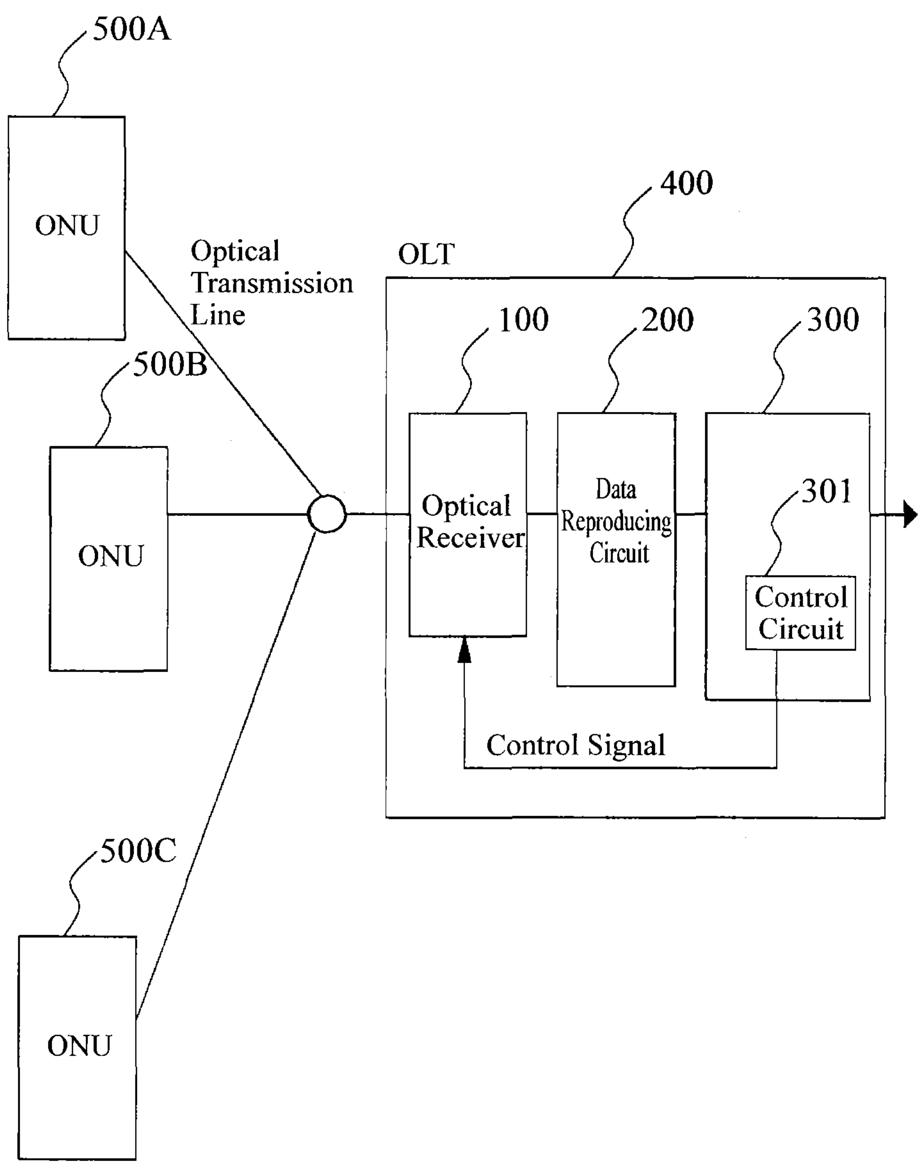
FIG. 1 is a block diagram showing a configuration of a PON system including an OLT of an embodiment 1 in accordance with the present invention.
Figure 2:
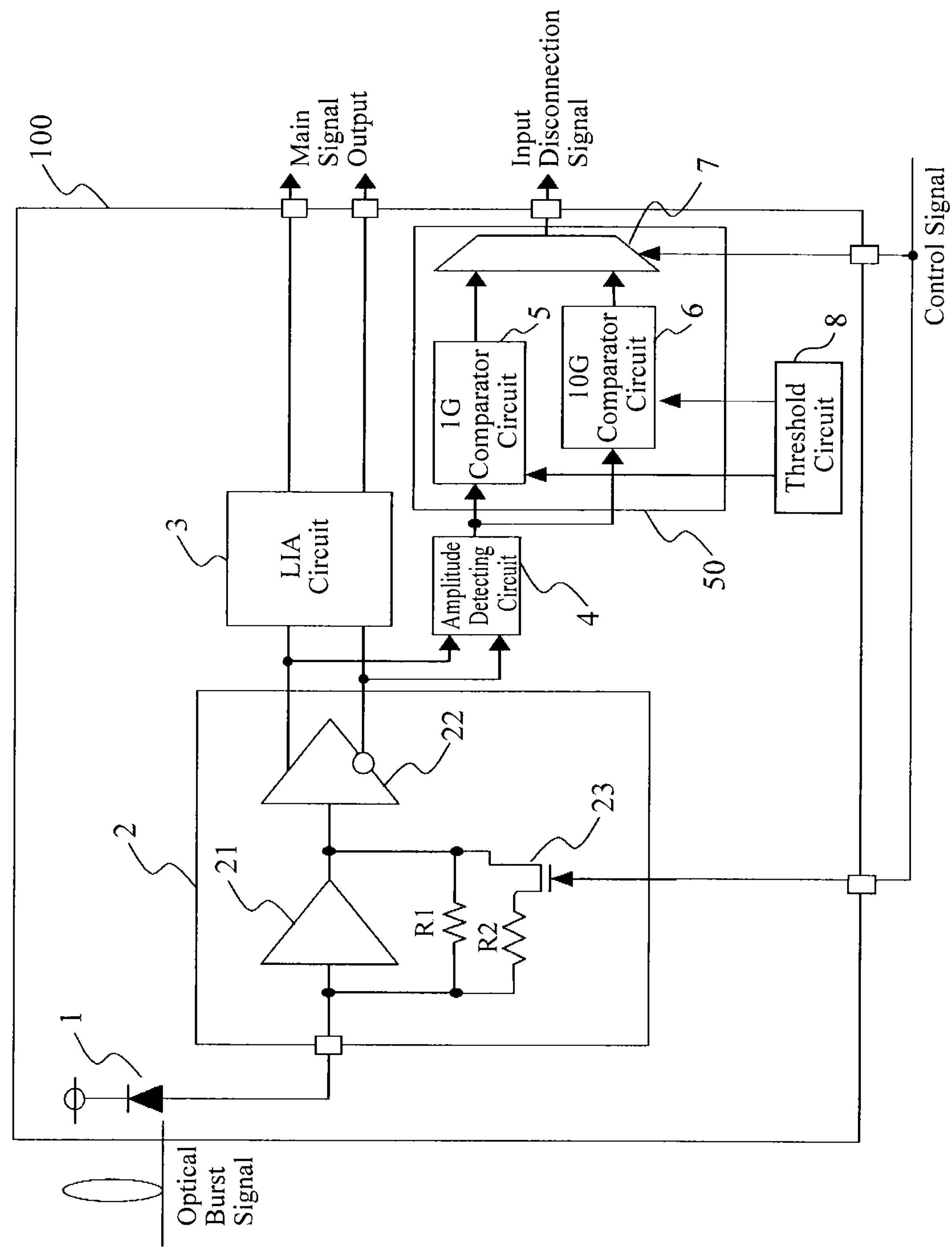
FIG. 2 is a block diagram showing a configuration of an optical receiver in the OLT of the embodiment 1 in accordance with the present invention.
Figure 3:
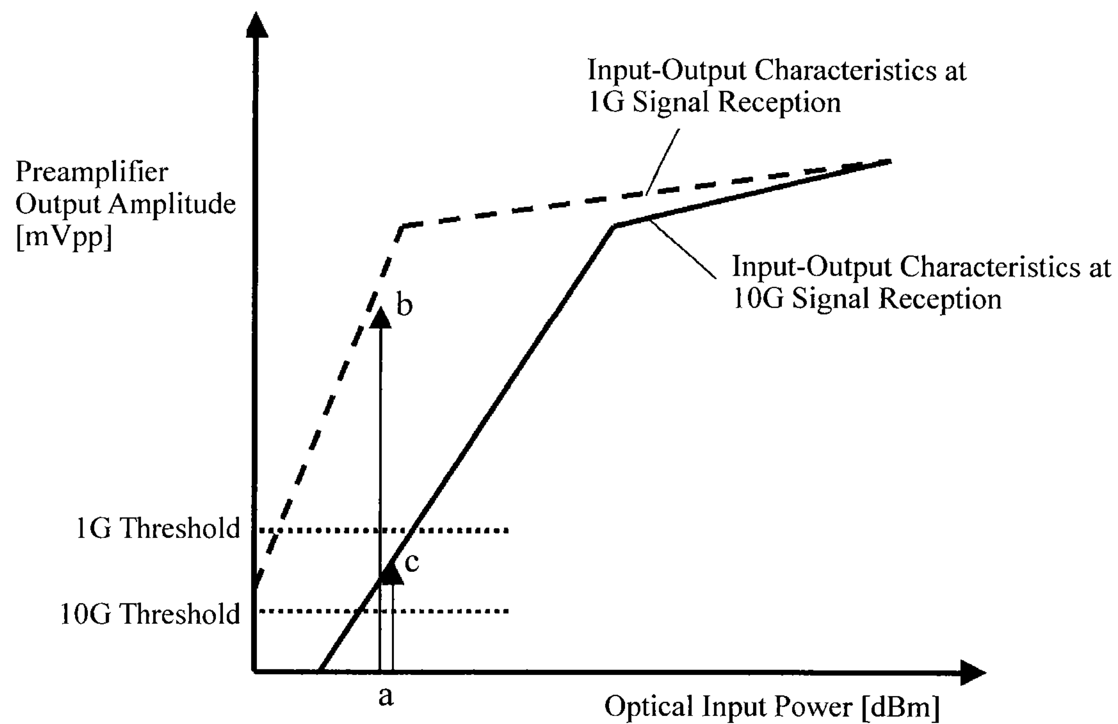
FIG. 3 is a diagram illustrating relationships between a 1G threshold and a 10G threshold of the embodiment 1 in accordance with the present invention.
Figure 4:
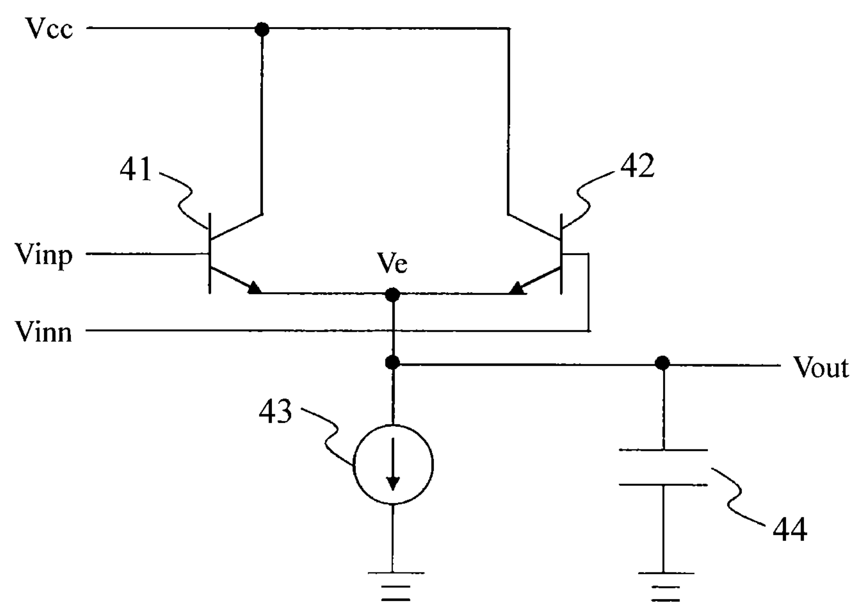
FIG. 4 is a circuit diagram showing a configuration of an amplitude detecting circuit of the embodiment 1 in accordance with the present invention.
Figure 5:
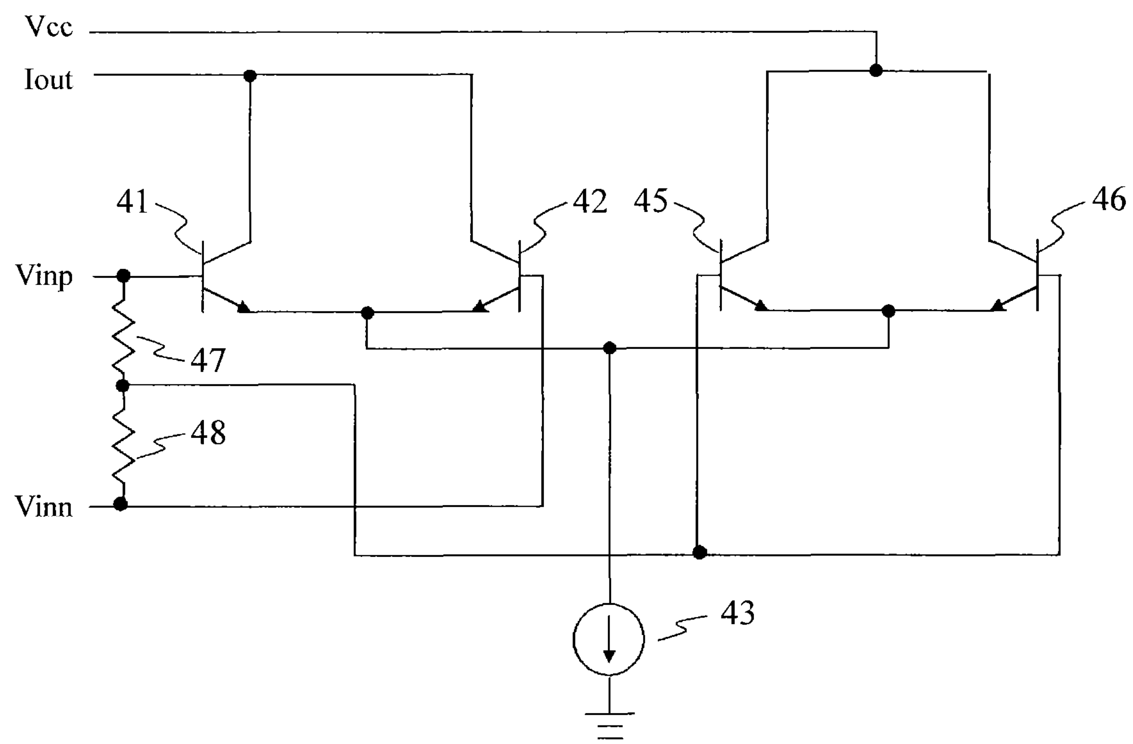
FIG. 5 is a circuit diagram showing another configuration of the amplitude detecting circuit of the embodiment 1 in accordance with the present invention.
Figure 6:
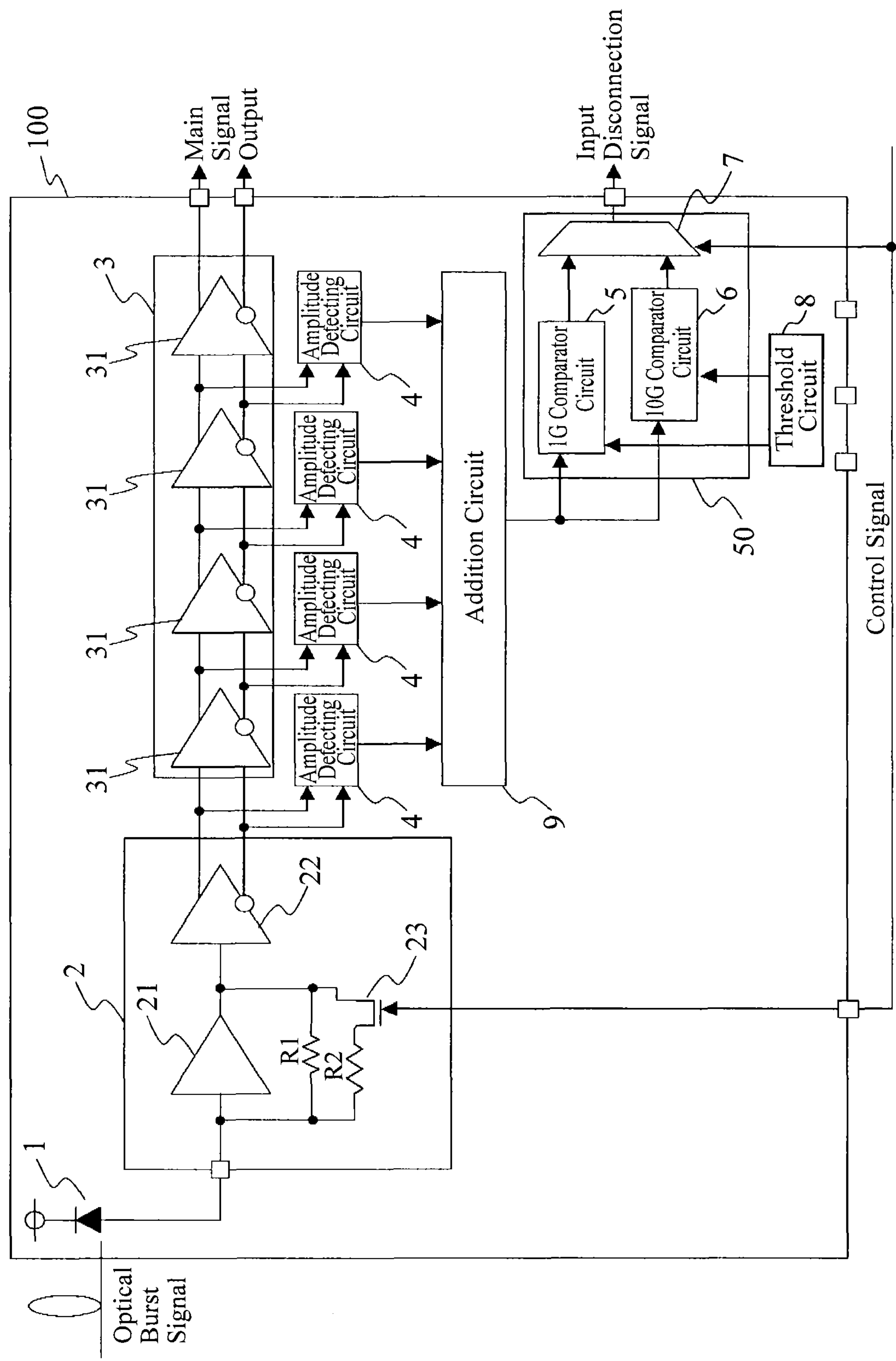
FIG. 6 is a block diagram showing a configuration of an LIA circuit of the embodiment 1 in accordance with the present invention.
Figure 7:
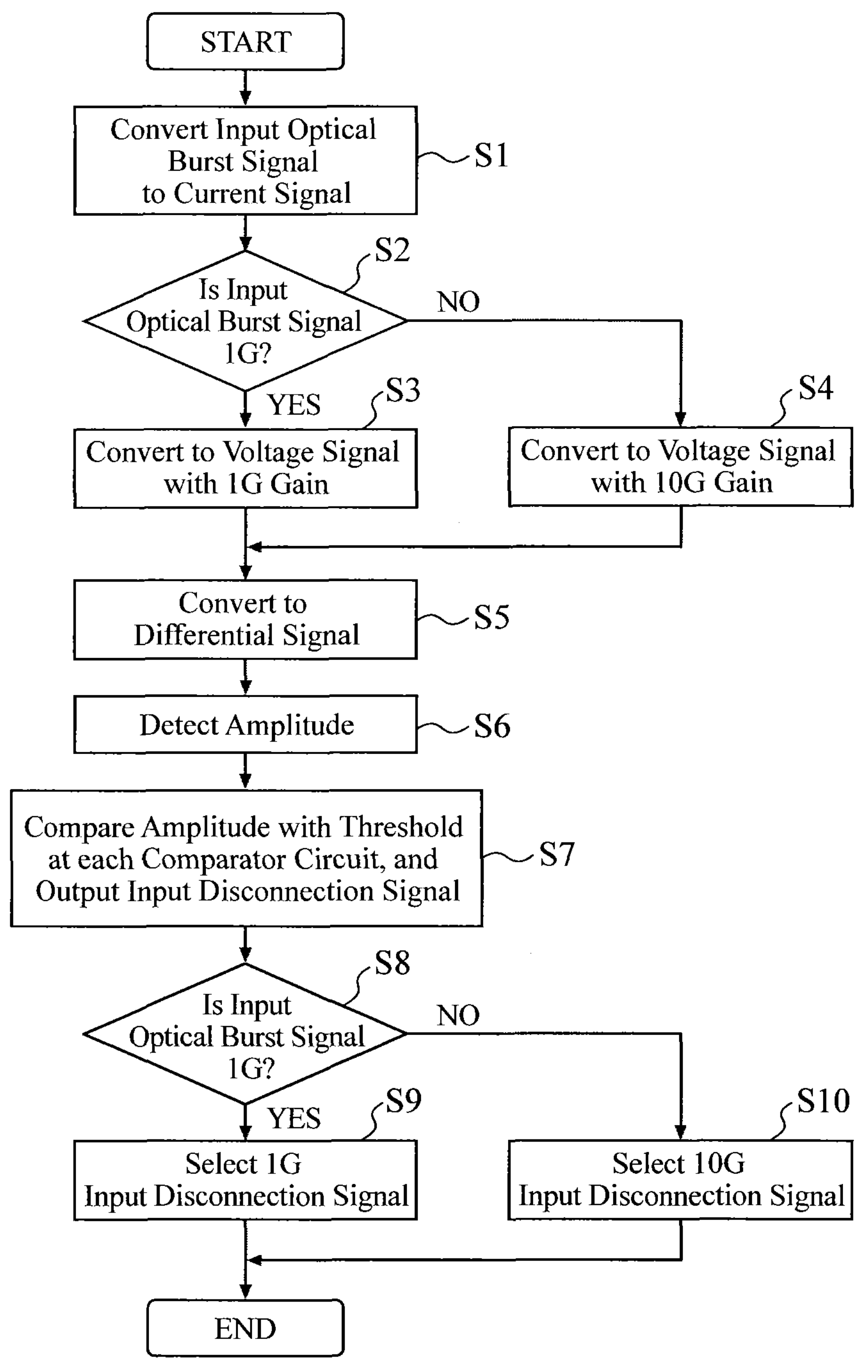
FIG. 7 is a flowchart showing the operation of the embodiment 1 in accordance with the present invention.
Figure 8:
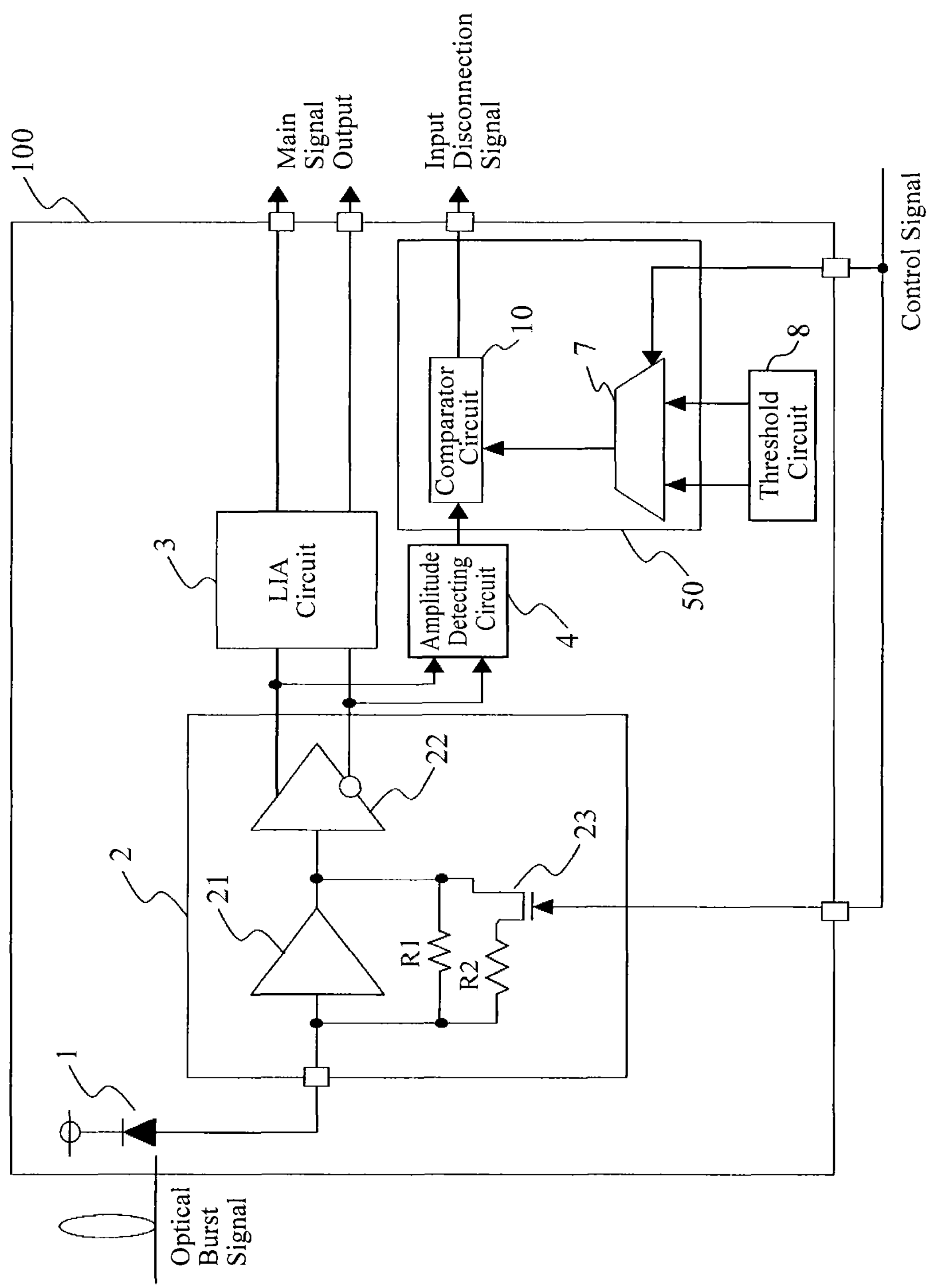
FIG. 8 is a block diagram showing a configuration of an optical receiver of the embodiment 1 in accordance with the present invention.
Figure 9:
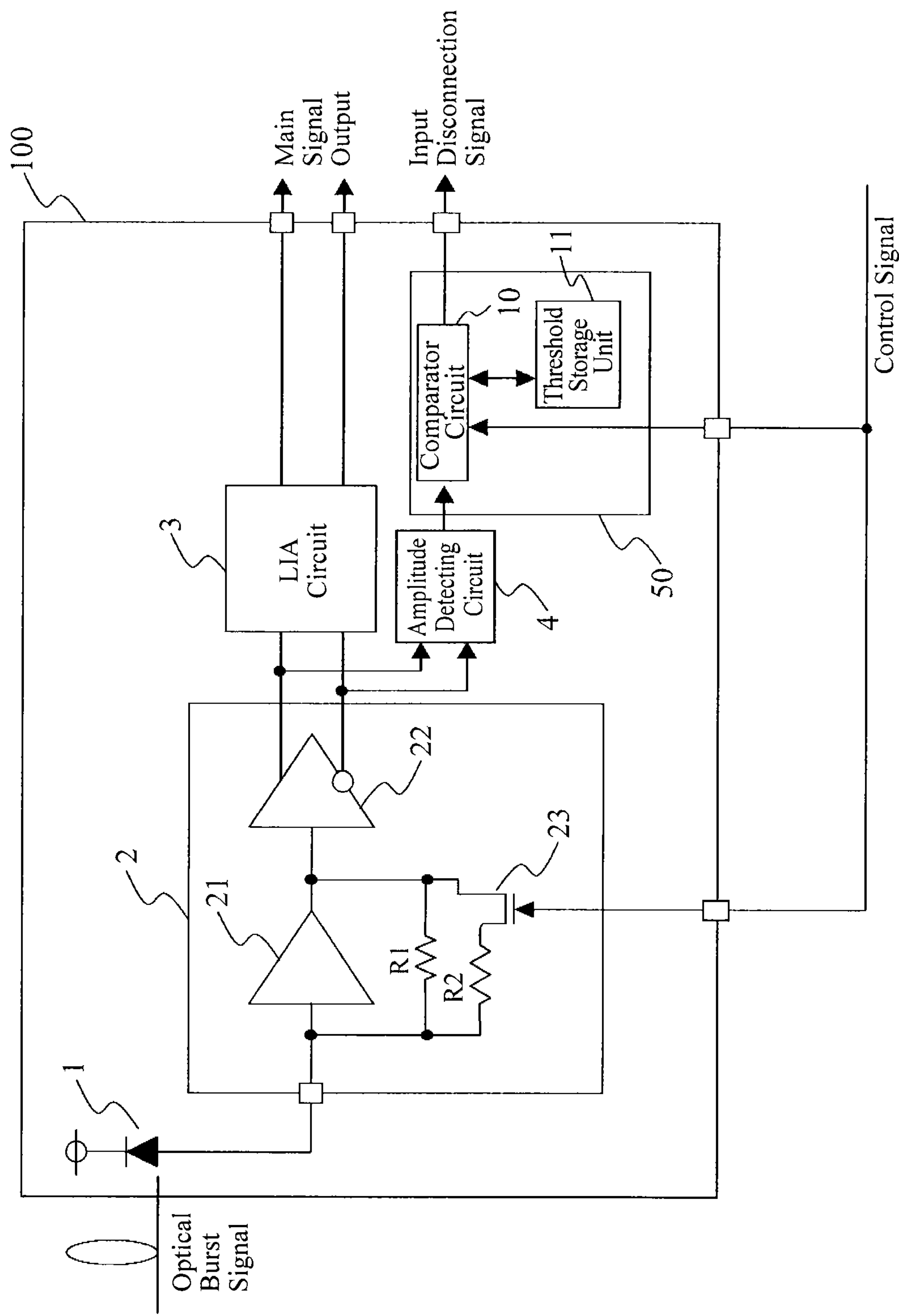
FIG. 9 is a block diagram showing another configuration of the optical receiver of the embodiment 1 in accordance with the present invention.
Figure 10:
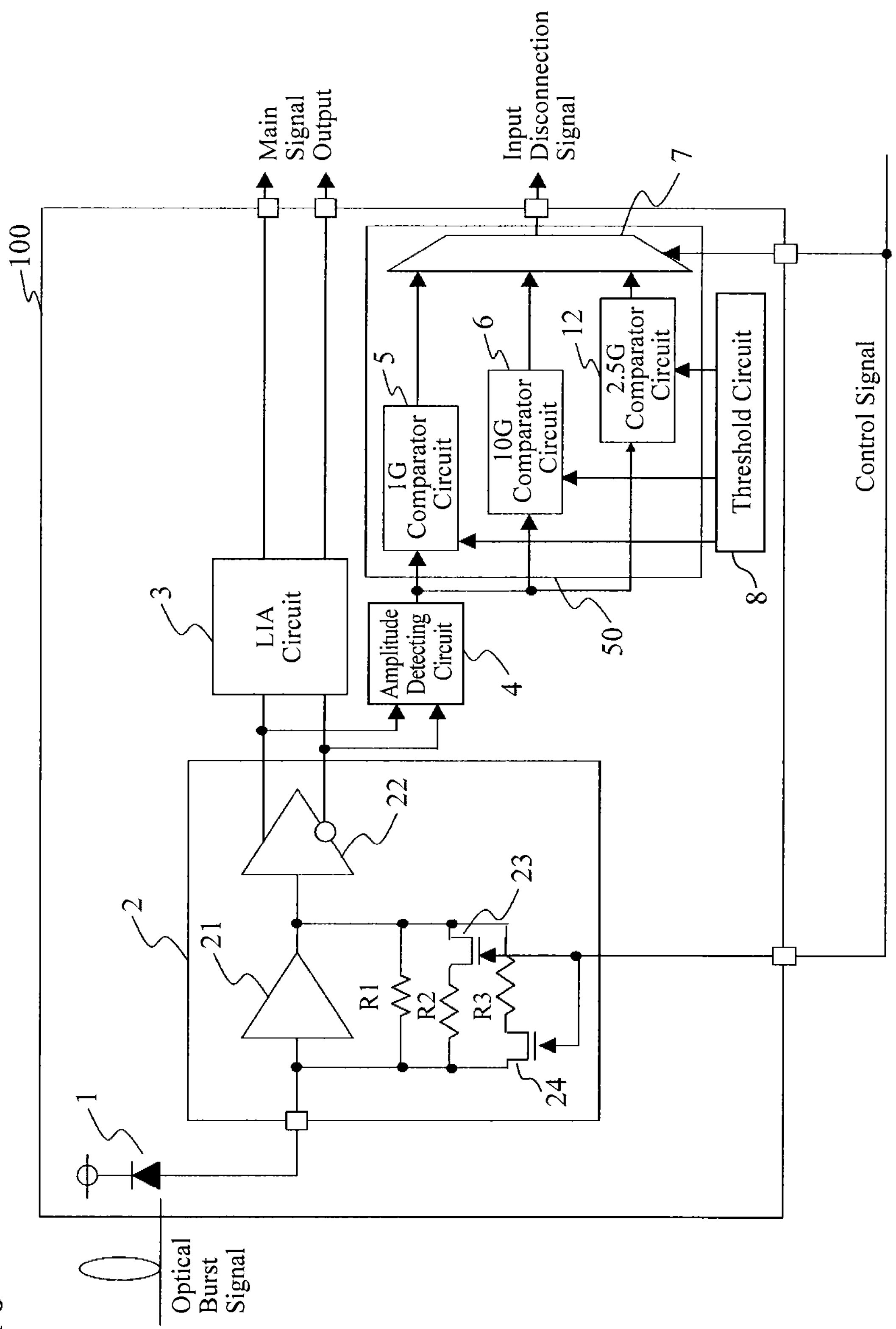
FIG. 10 is a block diagram showing another configuration of the optical receiver of the embodiment 1 in accordance with the present invention.

FIG. 1 is a block diagram showing a configuration of a PON system including an OLT of an embodiment 1 in accordance with the present invention. FIG. 2 is a block diagram showing a configuration of an optical receiver in the OLT of the embodiment 1 in accordance with the present invention. FIG. 3 is a diagram illustrating relationships between a 1G threshold and a 10G threshold of the embodiment 1 in accordance with the present invention. FIG. 4 is a circuit diagram showing a configuration of an amplitude detecting circuit of the embodiment 1 in accordance with the present invention. FIG. 5 is a circuit diagram showing another configuration of the amplitude detecting circuit of the embodiment 1 in accordance with the present invention. FIG. 6 is a block diagram showing a configuration of an LIA circuit of the embodiment 1 in accordance with the present invention. FIG. 7 is a flowchart showing the operation of the embodiment 1 in accordance with the present invention. FIG. 8 is a block diagram showing a configuration of an optical receiver of the embodiment 1 in accordance with the present invention. FIG. 9 is a block diagram showing another configuration of the optical receiver of the embodiment 1 in accordance with the present invention; and FIG. 10 is a block diagram showing another configuration of the optical receiver of the embodiment 1 in accordance with the present invention.

As shown in FIG. 1, the PON system comprises an OLT 400 and a plurality of ONUs 500A, 500B and 500C which are connected via optical transmission lines. The plurality of ONUs 500 carry out time division multiplexing of optical burst signals with different transmission rates and transmit them to the OLT 400. For example, there are some cases where the transmission rate of the optical burst signal from the ONU 500A is 10.3125 Gbps, and the transmission rate of the optical burst signals from the ONUs 500B and 500C is 1.25 Gbps. However, the transmission rates are not limited to them, and the number of the ONUs 500 is not limited to three.

The OLT 400 comprises an optical receiver 100, a data reproducing circuit 200, anda PON-LSI 300 which includes a control circuit 301. When an ONU 500 transmits an optical burst signal to the OLT 400, the optical receiver 100 in the OLT 400 converts the optical burst signal to an electric signal and amplifies the electric signal. Receiving the signal converted and amplified by the optical receiver 100, the data reproducing circuit 200 plays back a clock signal which is a timing component and data in synchronization with the input signal. The PON-LSI 300 outputs the played-back data to a higher-level apparatus such as a server not shown in FIG. 1. Incidentally, although FIG. 1 shows only the optical receiver 100 in the OLT 400 for the sake of simplicity, a configuration is also possible which comprises in addition to the optical receiver 100 an optical transmitter operating at 10.3125 Gbps and an optical transmitter operating at 1.25 Gbps. In addition, instead of the configuration comprising the optical receiver 100 and the optical transmitters, a configuration is also possible which comprises an optical transmitter-receiver into which the optical receiver 100 and optical transmitter are incorporated.

The control circuit 301 controls the optical receiver 100 by supplying a control signal to the optical receiver 100. The control signal is a binary signal corresponding to the transmission rates of the optical burst signal input to the OLT 400. For example, when the optical burst signal with the transmission rate of 1.25 Gbps is input to the OLT 400, the control circuit 301 outputs a Low signal and when the optical burst signal with the transmission rate of 10.3125 Gbps is input, it outputs a High signal. Although the control signal is supplied to a preamplifier circuit 2 and to an input disconnection detecting circuit 50 in the optical receiver 100 shown in FIG. 2, details of the control will be described later. Incidentally, as for the control signal, it can be a High signal when the 1.25 Gbps optical burst signal is input, and a Low signal when the 10.3125 Gbps optical burst signal is input.

Before the OLT 400 receives the optical burst signal from each ONU 500, the control circuit 301 receives from each ONU 500 a REPORT signal for reporting the transmission start time of the optical burst signal which is upstream data. The control circuit 301 makes a schedule in accordance with the information it receives, assigns the transmission start time to each ONU 500, and transmits a GATE signal with the assignment information to each ONU 500. Each ONU 500 that receives the GATE signal transmits the optical burst signal at the time designated by the OLT 400. Exchanging such MPCP (Multi Point Control Protocol) messages, the control circuit 301 knows before the optical burst signal from each ONU 500 is input to the OLT 400, what time the optical burst signal with which transmission rate is input. Thus the control circuit 301 can output the control signal (Low) at the time when a 1.25 Gbps optical burst signal is input, and output the control signal (High) at the time when a 10.3125 Gbps optical burst signal is input.

Next, details of the configuration of the optical receiver 100 in the OLT 400 will be described. As shown in FIG. 2, the optical receiver 100 of the embodiment 1 in accordance with the present invention comprises a photo-detector 1, a preamplifier circuit 2, an LIA (Limiting Amplifier) circuit 3, an amplitude detecting circuit 4, an input disconnection detecting circuit 50 and a threshold circuit 8. The preamplifier circuit 2 comprises a TIA (Trans Impedance Amplifier) circuit 21, and a single-phase differential converter circuit 22. The input disconnection detecting circuit 50 comprises a 1G comparator circuit 5, a 10G comparator circuit 6, and a selector 7.

The photo-detector 1 converts the burst signals with different transmission rates transmitted from a plurality of ONUs 500 to a current signal. The photo-detector 1 has its cathode connected to a power supply, and its anode connected to the input terminal of the TIA circuit 21, and is realized by an APD (Avalanche Photo Diode), PIN-PD or the like, for example.

The TIA circuit 21 converts the current signal passing through the conversion by the photo-detector 1 to a voltage signal, and outputs it as an output signal. The control circuit 301 controls the conversion gain of the TIA circuit 21 in such a manner as to make the conversion gain correspond to the transmission rate of the optical burst signal input to the OLT 400.

The TIA circuit 21 is connected in parallel with a 1G feedback resistor R1 and a 10G feedback resistor R2, and switches a MOSFET (Metal Oxide Semiconductor Field Effect Transistor) 23 connected to the 10G feedback resistor R2 in response to the control signal from the control circuit 301. The switching alters the feedback resistance determined by the 1G feedback resistor R1 and the 10G feedback resistor R2, thereby varying the conversion gain of the TIA circuit 21.

The single-phase differential converter circuit 22 converts the single-phase voltage signal the TIA circuit 21 outputs to a positive-phase signal and a negative-phase signal. A combination of the positive-phase signal and negative-phase signal is referred to as a differential signal.

Even if the received optical signal power is the same, the amplitude of the output signal of the preamplifier circuit 2 comprising the TIA circuit 21 and the single-phase differential converter circuit 22 varies because of the conversion gain control of the TIA circuit 2. Accordingly, it can be said that in response to the control signal, the control circuit 301 controls the conversion gain of the preamplifier circuit 2 to the conversion gain corresponding to the transmission rate of the optical burst signal input to the OLT 400.

The LIA circuit 3 amplifies the differential signal with different amplitude output from the single-phase differential converter circuit 22 to signals with constant amplitude and applies waveform shaping to them, and outputs as a main signal. The main signal is supplied to the data reproducing circuit 200 shown in FIG. 1.

The amplitude detecting circuit 4 receives the differential signal from the single-phase differential converter circuit 22, that is, the output signal of the preamplifier circuit 2, and detects the amplitude thereof. The amplitude detecting circuit 4 supplies the detected amplitude to the 1G comparator circuit 5 and the 10G comparator circuit 6 in the input disconnection detecting circuit 50.

In the threshold circuit 8, a plurality of thresholds are set in advance which correspond to the transmission rates of the optical burst signals sent from the individual ONUs 500. The threshold circuit 8 supplies the threshold among the plurality of thresholds, which corresponds to each transmission rate, to the 1G comparator circuit 5 and 10G comparator circuit 6 in the input disconnection detecting circuit 50 as the threshold signal. More specifically, the threshold circuit 8 supplies the 1G comparator circuit 5 with the 1G threshold corresponding to the 1.25 Gbps optical burst signal as a 1G threshold signal, and the 10G comparator circuit 6 with the 10G threshold corresponding to the 10.3125 Gbps optical burst signal as a 10G threshold signal. Incidentally, a configuration is also possible which locates the threshold circuit 8 outside the optical receiver 100 such as in the PON-LSI 300.

When the OLT 400 receives the 1.25 Gbps optical burst signal, the 1G comparator circuit 5 compares the amplitude of the output signal of the preamplifier circuit 2 relating to the 1.25 Gbps optical burst signal supplied from the amplitude detecting circuit 4 with the 1G threshold supplied from the threshold circuit 8. The 1G threshold is a set value corresponding to the 1.25 Gbps optical burst signal. When the amplitude is lower than the 1G threshold, the 1G comparator circuit 5 detects the disconnection of the input of the optical burst signal, and outputs a 1G input disconnection signal indicating the input disconnection. When the amplitude is greater than the 1G threshold, the 1G comparator circuit does not output the 1G input disconnection signal.

When the OLT 400 receives the 10.3125 Gbps optical burst signal, the 10G comparator circuit 6 compares the amplitude of the output signal of the preamplifier circuit 2 relating to the 10.3125 Gbps optical burst signal supplied from the amplitude detecting circuit 4 with the 10G threshold supplied from the threshold circuit 8. The 10G threshold is a set value corresponding to the 10.3125 Gbps optical burst signal, and is set lower than the 1G threshold. When the amplitude is lower than the 10G threshold, the 10G comparator circuit 6 detects the disconnection of the input of the optical burst signal, and outputs a 10G input disconnection signal indicating the input disconnection. When the amplitude is greater than the 10G threshold, the 10G comparator circuit does not output the 10G input disconnection signal.

The 1G comparator circuit 5 and the 10G comparator circuit 6 can be realized by a hysteresis comparator, for example.

The selector 7 selects one of the 1G input disconnection signal from the 1G comparator circuit 5 and the 10G input disconnection signal from the 10G comparator circuit 6 in accordance with the transmission rate of the input optical burst signal. More specifically, the selector is controlled in such a manner that when the 1.25 Gbps burst signal is input to the OLT 400, it selects the 1G input disconnection signal in response to the control signal (Low) from the control circuit 301, and that when the 10.3 Gbps burst signal is input to the OLT 400, it selects the 10G input disconnection signal in response to the control signal (High). The input disconnection signal selected by the selector is supplied to the PON-LSI 300, and the OLT 400 grasps the input disconnection.

In this way, the input disconnection detecting circuit 50 comprising the 1G comparator circuit 5, 10G comparator circuit 6 and selector 7 is controlled by the control circuit 301 in such a manner that it compares the amplitude output from the amplitude detecting circuit 4 with the threshold which corresponds to the transmission rate of the input optical burst signal among the plurality of thresholds output from the threshold circuit 8, and outputs the input disconnection signal when the amplitude is less than the threshold. Incidentally, the input disconnection can be expressed in terms of LOS (Loss Of Signal) so that it is possible to express the input disconnection detection as LOS detection, the input disconnection detecting circuit 50 as a LOS detecting circuit 50, and the input disconnection signal as a LOS signal.

Here, relationships between the 1G threshold and 10G threshold will be described with reference to FIG. 3. In FIG. 3, the horizontal axis shows the optical input power (dBm) and the vertical axis shows the output amplitude (mVpp) of the preamplifier circuit 2, and the broken line shows the input-output characteristics of the preamplifier circuit 2 when the 1.25 Gbps optical burst signal is input, and the solid line shows the input-output characteristics of the preamplifier circuit 2 when the 10.3125 Gbps optical burst signal is input.

As shown in FIG. 3, when the optical input power of the 1.25 Gbps optical burst signal and that of the 10.3125 Gbps optical burst signal to the optical receiver 100 are the same at a (dBm), the output amplitude of the preamplifier circuit 2 is b (mVpp) for the 1.25 Gbps and c (mVpp) for the 10.3125 Gbps, where b>c. This is because the conversion gain of the preamplifier circuit 2 is higher for the 1.25 Gbps signal than for the 10.3125 Gbps signal. Accordingly, it is necessary for the 1G threshold and 10G threshold to be set in such a manner that the 1G comparator circuit 5 and the 10G comparator circuit 6 do not bring about different input disconnection detection results.

In other words, as for the 1G threshold and 10G threshold, they must be set in such a manner that when the 1.25 Gbps output amplitude b is greater than the 1G threshold, the 10.3125 Gbps output amplitude c is greater than the 10G threshold, and when the 1.25 Gbps output amplitude b is less than the 1G threshold, the 10.3125 Gbps output amplitude c is less than the 10G threshold. This makes it possible to prevent the input disconnection detection result by the 1G comparator circuit 5 and the input disconnection detection result by the 10G comparator circuit 6 from bringing about different results, and to prevent the OLT 400 from grasping the input disconnection erroneously. For example, considering that the gain-bandwidth product of the preamplifier circuit 2 is fixed, the 10G threshold can be set at about one eighth of the 1G threshold. The 1G threshold and 10G threshold thus set are appropriate thresholds considering the gain-bandwidth product of the preamplifier circuit 2 when the transmission rates of the input optical burst signals are 1.25 Gbps and 10.3125 Gbps. Thus the preamplifier circuit 2 can convert the input signal at the appropriate gain, and can perform the input disconnection detection as to the signal converted at the gain using the appropriate threshold.

A circuit configuration of the amplitude detecting circuit 4 will be described with reference to FIG. 4. The amplitude detecting circuit 4 comprises transistors 41 and 42 forming a differential pair, a constant current source 43, and a capacitor 44. The symbol Vcc designates power supply voltage, Vinp designates the voltage of the positive-phase signal of the single-phase differential converter circuit 22, and Vinn designates the voltage of the negative-phase signal of the single-phase differential converter circuit 22, and Vout designates the output voltage of the amplitude detecting circuit 4. In the amplitude detecting circuit 4, since the common-emitter voltage Ve of the transistors 41 and 42 drops in proportion to an increase in the input amplitude of the differential signal, the amplitude of the input differential signal can be determined by measuring the output voltage Vout.

As for the capacitor 44, an appropriate capacitance is selected in accordance with the transmission rate, same sign continuous length and input disconnection issuing request timing so as to determine the time constant of the output voltage Vout of the amplitude detecting circuit 4 at a suitable value. In addition, since the capacitor 44 has an effect of improving noise immunity such as against switching noise, an external circuit can be provided for discharging the capacitor 44 in response to the reset signal input for each optical burst signal. This enables both the high noise immunity and high-speed input disconnection issuing timing.

Incidentally, the amplitude detecting circuit 4 can be achieved with a peak detecting circuit comprising a diode, capacitor and the like. In this case also, it is necessary to keep an appropriate convergence time constant corresponding to the transmission rate of the input optical burst signal and the same sign continuous length.

Alternatively, the amplitude detecting circuit 4 can have a circuit configuration as shown in FIG. 5. The amplitude detecting circuit 4 comprises transistors 41 and 42 and transistors 45 and 46, which form differential pairs, a constant current source 43, and resistors 47 and 48. The symbol Vcc designates power supply voltage, Vinp designates the voltage of the positive-phase signal of the single-phase differential converter circuit 22, Vinn designates the voltage of the negative-phase signal of the single-phase differential converter circuit 22, and Iout designates an amplitude detection output current. The circuit shown in FIG. 5 supplies the bases of the transistors 45 and 46 with the midpoint voltage of the differential input signal using the resistors 47 and 48 with the same resistance. This enables determining the amplitude of the input differential signal by measuring the output current Iout because the ratio between the current flowing from the Iout terminal to the differential pair having the transistors 41 and 42 and the current flowing from the Vcc terminal to the transistors 45 and 46 varies in accordance with the input signal amplitude. Incidentally, to achieve the voltage conversion of the output current Iout, for example, applying the TIA circuit 21 and connecting the input terminal of the TIA circuit 21 to the Iout make it possible to convert the output signal of the circuit shown in FIG. 5 to the voltage signal. In addition, a configuration comprising a capacitor is also applicable because the noise immunity of the midpoint voltage of the differential input signal supplied to the bases of the transistors 45 and 46 can be improved by connecting a capacitor across the connection point of the resistors 47 and 48 and the GND terminal. In addition, as for the number of the differential pairs to which the midpoint potential of the differential input signal is applied, more than one pairs can be prepared to change the ratio between the constant current source 43 and the output current Iout.

A variation of the LIA circuit 3 will be described. As shown in FIG. 6, the LIA circuit 3 can incorporate multistage differential amplifier circuits 31. The configuration also incorporates multistage amplitude detecting circuits 4, and the differential signals output from the individual differential amplifier circuits 31 are supplied to the amplitude detecting circuits 4, respectively. The output voltages of the amplitude detecting circuits 4 are supplied to an addition circuit 9. The addition circuit 9 calculates the amplitude by adding the output voltages supplied, and delivered it to the 1G input disconnection detecting circuit 5 and 10G input disconnection detecting circuit 6. The LIA circuit 3 with the configuration of the multistage differential amplifier circuits 31 can improve the resolution of the input amplitude. Incidentally, when using the circuit configuration as shown in FIG. 5 as the amplitude detecting circuit 4, the addition circuit 9 can be configured in such a manner as to perform current addition, followed by current-to-voltage conversion by applying the TIA circuit 21, for example, and then by supplying the resultant voltage to the input disconnection detecting circuit 50.

Next, the operation of the input disconnection detection in the present invention will be described with reference to FIG. 7. It is assumed here that the transmission rate of the input optical burst signal from an ONU 500 takes one of the 1.25 Gbps and 10.3125 Gbps. When the optical burst signal is input from the ONU 500, the photo-detector 1 converts the optical burst signal to a current signal (step S1)

When the input optical burst signal is 1.25 Gbps (Yes at step S2), the preamplifier circuit 2 converts the input current signal to a voltage signal with the gain for 1G (step S3). The conversion gain of the preamplifier circuit 2 is controlled by the control signal from the control circuit 301 which grasps in advance that the 1.25 Gbps optical burst signal will be input. More specifically, the control signal which is a Low signal switches the MOSFET 23 and controls in such a manner as to prevent the current from flowing through the 10G feedback resistor R2. In this case, the conversion gain of the TIA circuit 21 is determined by the 1G feedback resistor R1. As a result, the conversion gain of the preamplifier circuit 2 becomes the conversion gain for 1G.

When the input optical burst signal is 10.3125 Gbps (No at step S2), the preamplifier circuit 2 converts the input current signal to a voltage signal with the gain for 10G (step S4). In this case, the control circuit 301 outputs the control signal which is a High signal to switch the MOSFET 23 and controls in such a manner as to cause the current to flow through the 10G feedback resistor R2. Thus the conversion gain of the TIA circuit 21 is determined by the combined resistance of the 1G feedback resistor R1 and 10G feedback resistor R2. Since the combined resistance is less than the 1G feedback resistor R1, the conversion gain of the TIA circuit 21 is lower than that when the 1.25 Gbps burst signal is input. More specifically, when the input burst signal is fast, since the gain-bandwidth product of the TIA circuit 21 is fixed, the TIA circuit 21 is controlled in such a manner as to have a smaller conversion gain. In this way, the conversion gain of the TIA circuit 21 takes a value corresponding to the transmission rate of the burst signal input to the OLT 400 in accordance with the control signal.

The single-phase differential converter circuit 22 converts the single-phase voltage signal, which undergoes the conversion by the preamplifier circuit 2, to the differential signal (step S5).

The amplitude detecting circuit 4 detects the amplitude from the differential signal output from the single-phase differential converter circuit 22 (step S6), and supplies it to the 1G comparator circuit 5 and 10G comparator circuit 6.

The 1G comparator circuit 5 compares the amplitude output from the amplitude detecting circuit 4 with the 1G threshold supplied from the threshold circuit 8, and supplies the 1G input disconnection signal to the selector 7 if the amplitude detected by the amplitude detecting circuit 4 is less than the 1G threshold. The 10G comparator circuit 6 compares the amplitude output from the amplitude detecting circuit 4 with the 10G threshold supplied from the threshold circuit 8, and supplies the 10G input disconnection signal to the selector 7 if the amplitude detected by the amplitude detecting circuit 4 is less than the 10G threshold (step S7). In this way, since the comparator circuits 5 and 6 each compare the amplitude with the threshold corresponding to the transmission rate, they can prevent the input disconnection signal from being output erroneously.

The selector 7 selects one of the 1G input disconnection signal and 10G input disconnection signal supplied thereto, which corresponds to the transmission rate of the input optical burst signal in accordance with the control signal from the control circuit 301. When the input optical burst signal is 1.25 Gbps (Yes at step S8), the selector 7 selects the 1G input disconnection signal, and supplies it to the PON-LSI 300 as the input disconnection signal from the optical receiver 100 (step S9).

On the other hand, when the input optical burst signal is 10.3125 Gbps (No at step S8), the selector 7 selects the 10G input disconnection signal, and supplies it to the PON-LSI 300 as the input disconnection signal from the optical receiver 100 (step S10).

As described above, according to the embodiment 1 in accordance with the present invention, the control circuit 301 controls the preamplifier circuit 2 in such a manner that it has the conversion gain corresponding to the transmission rate of the optical burst signal input to the OLT 400, and controls the input disconnection detecting circuit 50 in such a manner that it outputs the input disconnection signal in accordance with the threshold corresponding to the transmission rate of the input optical burst signal. Thus, it can output the input disconnection signal properly from the optical receiver 100. Accordingly, the OLT 400 can carry out the input disconnection detection accurately in accordance with each transmission rate of the optical burst signal.

Incidentally, although the present embodiment is described on the assumption that it has a configuration in which the input disconnection detecting circuit 50 comprises the two circuits, the 1G comparator circuit 5 and the 10G comparator circuit 6, this is not essential. For example, as shown in FIG. 8 and FIG. 9, a configuration is possible which comprises only a single comparator circuit 10.

In the configuration shown in FIG. 8, the input disconnection detecting circuit 50 comprises the comparator circuit 10 and the selector 7. The selector 7 is supplied with the 1G threshold and 10G threshold from the threshold circuit 8. In response to the control signal from the control circuit 301, the selector 7 is controlled in such a manner as to select the threshold corresponding to the transmission rate of the input optical burst signal from among the thresholds output from the threshold circuit 8. For example, when the 1.25G optical burst signal is input, the selector 7 selects the 1G threshold in response to the control signal (Low), and when the 10.3125 Gbps optical burst signal is input, the selector 7 selects the 10G threshold in response to the control signal (High). The comparator circuit 8 compares the amplitude of the output signal of the preamplifier circuit 2 with the threshold selected by the selector 7, and outputs, if the amplitude is lower than the threshold selected, the input disconnection signal. The input disconnection signal output from the comparator circuit 10 becomes the output from the input disconnection detecting circuit 50 and is supplied to the PON-LSI 300.

In the configuration shown in FIG. 9, the input disconnection detecting circuit 50 comprises the comparator circuit 10 and a threshold storage unit 11. The threshold storage unit 11 retains the 1G threshold and 10G threshold in advance. When the control signal is supplied from the control circuit 301, the comparator circuit 10 is controlled in such a manner as to select the threshold corresponding to the transmission rate of the input optical burst signal from the threshold storage unit 11. For example, when the 1.25G optical burst signal is input, the comparator circuit 10 picks out the 1G threshold from the threshold storage unit 11 in accordance with the value of the control signal (Low), and compares the amplitude detected by the amplitude detecting circuit 4 with it. If the amplitude is lower than the threshold, it outputs the input disconnection signal. When the 10.3125G optical burst signal is input, the comparator circuit 10 picks out the 10G threshold from the threshold storage unit 11 in accordance with the value of the control signal (High), and compares the amplitude detected by the amplitude detecting circuit 4 with it. If the amplitude is lower than the threshold, it outputs the input disconnection signal. The input disconnection signal output from the comparator circuit 10 becomes the output from the input disconnection detecting circuit 50, and is supplied to the PON-LSI 300.

In addition, although the present embodiment is described on the assumption that the transmission rate of the optical burst signal input to the OLT 400 is 1.25 Gbps and 10.3125 Gbps, this is not essential. For example, three or more optical burst signals with different transmission rates can be input to the OLT 400. In this case, as for the control signal output from the control circuit 301, it is not a binary signal but a multi-valued signal, and each value corresponds to one of the transmission rates.

For example, when the input burst signal consists of three types, 1.25 Gbps, 2.5 Gbps, and 10.3125 Gbps, the preamplifier circuit 3 has a parallel connection of the feedback resistors R1, R2 and R3 as shown in FIG. 10, and the gain switching corresponding to the transmission rate of the optical burst signal is performed by switching the MOSFETs 23 and 24 connected with the feedback resistors R2 and R3 in response to the control signal. For example, in the case of 1.25 Gbps, the MOSFETs 23 and 24 are controlled in such a manner that the current flows through the feedback resistor R1 only. Likewise, in the case of 2.5 Gbps and 10.3125 Gbps, the MOSFETs 23 and 24 are controlled in such a manner that the current flows through the feedback resistors R1 and R2 and through the feedback resistors R1, R2, and R3, respectively.

The input disconnection detecting circuit 50 comprises a 2.5G comparator circuit 12 in addition to the 1G comparator circuit 5 and 10G comparator circuit 6. The 2.5G comparator circuit 12 receives the 2.5G threshold from the threshold circuit 8 and compares the amplitude detected by the amplitude detecting circuit 4 with the threshold. If the amplitude is lower than the 2.5G threshold, it outputs a 2.5G input disconnection signal. When an optical burst signal with the 2.5 Gbps transmission rate is input to the OLT 400, the selector 7 selects the 2.5G input disconnection signal from the 1G input disconnection signal, 10G input disconnection signal and 2.5G input disconnection signal in response to the control signal from the control circuit 301.

Incidentally, even if the number of types of the input optical burst signal is three or more, the input disconnection detecting circuit 50 can have the configuration as shown in FIG. 8 or FIG. 9. As for the configuration shown in FIG. 8, the selector 7 receives three or more thresholds from the threshold circuit 8. As for the configuration shown in FIG. 9, the threshold storage unit 11 stores three or more thresholds each of which corresponds to one of the transmission rates.

Incidentally, as for the unit for outputting the control signal, it is not limited to the control circuit 301 outside the optical receiver 100. For example, the control circuit can be provided in the optical receiver 100. When the control circuit is provided in the receiver 100, the control circuit decides the transmission rate from the input optical burst signal, produces the control signal from the transmission rate, and controls the conversion gain of the preamplifier circuit 2 and the selection of the input disconnection signal which is output from the input disconnection detecting circuit 50.

DESCRIPTION OF REFERENCE SYMBOLS

1 photo-detector
2 preamplifier circuit
21 TIA circuit
22 single-phase differential converter circuit
23 MOSFET
24 MOSFET
3 LIA circuit
31 differential amplifier circuit
4 amplitude detecting circuit
41, 42, 45, 46 transistor
43 constant current source
44 capacitor
47, 48 resistor
5 1G comparator circuit
6 10G comparator circuit
7 selector
8 threshold circuit
9 addition circuit
10 comparator circuit
11 threshold storage unit
12 2.5G comparator circuit
50 input disconnection circuit
100 optical receiver
200 data reproducing circuit
300 PON-LSI
301 control circuit
400 OLT
500A -500C ONU

What is claimed is:

1. An optical receiver that receives optical burst signals with different transmission rates from transmission sources via an optical transmission line, the optical receiver comprising:

a photo-detector to convert the optical burst signal received to a current signal;

a preamplifier circuit to convert the current signal to a voltage signal;

an amplitude detecting circuit to detect the amplitude of the voltage signal undergoing the conversion of the preamplifier circuit;

a threshold circuit having a plurality of thresholds which correspond to the transmission rates of the optical burst signals and are set in advance; and an input disconnection detecting circuit including a plurality of comparator circuits to compare the amplitude detected by the amplitude detecting circuit with each of the plurality of thresholds output from the threshold circuit, and to individually output an input disconnection signal indicating disconnection of input of the optical burst signal if the amplitude is lower than the threshold, and a selector to select one of the plurality of input disconnection signals output from the plurality of comparator circuits, wherein the selector selects the input disconnection signal in accordance with the threshold corresponding to the transmission rate of the optical burst signal received.

2. The optical receiver according to claim 1, wherein the preamplifier circuit undergoes control in a manner that its conversion gain corresponds to the transmission rate of the optical burst signal received.

3. An optical receiver that receives optical burst signals with different transmission rates from transmission sources via an optical transmission line, the optical receiver comprising:

a photo-detector to convert the optical burst signal received to a current signal;

a preamplifier circuit to convert the current signal to a voltage signal;

an amplitude detecting circuit to detect the amplitude of the voltage signal undergoing the conversion of the preamplifier circuit;

a threshold circuit having a plurality of thresholds which correspond to the transmission rates of the optical burst signals and are set in advance; and an input disconnection detecting circuit to compare the amplitude detected by the amplitude detecting circuit with a threshold which is output from the threshold circuit and corresponds to the transmission rate of the optical burst signal decided from information about a schedule of transmitting the optical burst signals of the transmission sources, and to output an input disconnection signal of the optical burst signal if the amplitude is lower than the threshold.

4. The optical receiver according to claim 3, wherein the preamplifier circuit undergoes control in a manner that its conversion gain corresponds to the transmission rate of the optical burst signal received.

5. An optical line terminal that receives optical burst signals with different transmission rates from a plurality of optical network units via an optical transmission line, the optical line terminal comprising:

a photo-detector to convert the optical burst signal received to a current signal;

a preamplifier circuit to convert the current signal to a voltage signal;

an amplitude detecting circuit to detect the amplitude of the voltage signal undergoing the conversion of the preamplifier circuit;

a threshold circuit having a plurality of thresholds which correspond to transmission rates of the optical burst signals and are set in advance;

an input disconnection detecting circuit including a plurality of comparator circuits to compare the amplitude detected by the amplitude detecting circuit with each of the plurality of thresholds output from the threshold circuit, and to individually output an input disconnection signal indicating disconnection of input of the optical burst signal if the amplitude is lower than the threshold, and a selector to select one of the plurality of input disconnection signals output from the plurality of comparator circuits; and a control circuit to control the selector in a manner that the selector selects the input disconnection signal in accordance with the threshold corresponding to the transmission rate of the optical burst signal received.

6. The optical line terminal according to claim 5, wherein the preamplifier circuit undergoes control in a manner that its conversion gain corresponds to the transmission rate of the optical burst signal received.

7. An optical line terminal that receives optical burst signals with different transmission rates from a plurality of optical network units via an optical transmission line, the optical line terminal comprising:

a photo-detector to convert the optical burst signal received to a current signal;

a preamplifier circuit to convert the current signal to a voltage signal;

an amplitude detecting circuit to detect the amplitude of the voltage signal undergoing the conversion of the preamplifier circuit;

a threshold circuit having a plurality of thresholds which correspond to transmission rates of the optical burst signals and are set in advance;

a control circuit to decide the transmission rate of the optical burst signal from information about a schedule of transmitting the optical burst signals from the optical network units; and an input disconnection detecting circuit to compare the amplitude detected by the amplitude detecting circuit with a threshold which is output from the threshold circuit and corresponds to the transmission rate of the optical burst signal decided by the control circuit, and to output an input disconnection signal of the optical burst signal if the amplitude is lower than the threshold.

8. The optical line terminal according to claim 7, wherein the preamplifier circuit undergoes control in a manner that its conversion gain corresponds to the transmission rate of the optical burst signal received.

* * * * *